(12) United States Patent
Yun et al.

(10) Patent No.: US 7,880,432 B2
(45) Date of Patent: Feb. 1, 2011

(54) BATTERY MANAGEMENT SYSTEM AND BATTERY MANAGEMENT METHOD

(75) Inventors: Han-Seok Yun, Suwon-si (KR); Se-Wook Seo, Suwon-si (KR); Gye-Jong Lim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 460 days.

(21) Appl. No.: 11/583,046

(22) Filed: Oct. 19, 2006

(65) Prior Publication Data

US 2007/0090798 A1    Apr. 26, 2007

(30) Foreign Application Priority Data

Oct. 20, 2005    (KR) ..................... 10-2005-0099087

(51) Int. Cl.
*H02J 7/00* (2006.01)
(52) U.S. Cl. .................... 320/116; 324/434; 702/63
(58) Field of Classification Search ............... 320/116; 324/429, 433, 434; 702/63, 64
See application file for complete search history.

(56) References Cited

U.S. PATENT DOCUMENTS

| | | |
|---|---|---|
| 5,153,496 A | 10/1992 | LaForge |
| 5,321,627 A | 6/1994 | Reher |
| 5,666,040 A | 9/1997 | Bourbeau |
| 5,701,068 A | 12/1997 | Baer et al. |

(Continued)

FOREIGN PATENT DOCUMENTS

CN    1415973 A    5/2003

(Continued)

OTHER PUBLICATIONS

"State of Charge" (Wikipedia—2 pages) print out from http://en.wikipedia.org/wiki/state_of_charge.

(Continued)

*Primary Examiner*—Edward Tso
*Assistant Examiner*—Ramy Ramadan
(74) *Attorney, Agent, or Firm*—Robert E. Bushnell, Esq.

(57) ABSTRACT

The battery management system of the present invention measures a cell voltage of a battery more efficiently using a small number of elements, and measures a pack current and voltage thereof when measuring the voltages of a plurality of cells. The battery management system is coupled to the battery formed with one pack having a plurality of battery cells. The battery includes a first sub-pack having first and second batteries among the plurality of battery cells. The battery management system includes first to fourth relays and an A/D converter. The first and the second relays transmit the cell voltages in response to respective first and second control signals by being coupled to each output terminal of the first and second battery cells of the first sub-pack. The third relay transmits the cell voltage transmitted though one of the first and second relays in response to a third control signal, and the first charging unit stores the cell voltage transmitted from the third relay. The fourth relay transmits the cell voltage stored in the first charging unit in response to a fourth control signal. The A/D converter converts the cell voltages transmitted through the fourth relay into digital data.

15 Claims, 5 Drawing Sheets

U.S. PATENT DOCUMENTS

| | | | |
|---|---|---|---|
| 5,773,959 A | 6/1998 | Merritt et al. | |
| 5,773,962 A | 6/1998 | Nor | |
| 5,796,334 A | 8/1998 | Chen et al. | |
| 5,952,815 A | 9/1999 | Rouillard et al. | |
| 6,014,013 A | 1/2000 | Suppanz et al. | |
| 6,078,165 A | 6/2000 | Ashtiani et al. | |
| 6,104,166 A | 8/2000 | Kikuchi et al. | |
| 6,127,806 A | 10/2000 | Tanjo et al. | |
| 6,157,169 A | 12/2000 | Lee | |
| 6,255,826 B1 | 7/2001 | Ohsawa et al. | |
| 6,268,710 B1 * | 7/2001 | Koga | 320/116 |
| 6,300,763 B1 | 10/2001 | Kwok | |
| 6,336,063 B1 | 1/2002 | Lennevi | |
| 6,362,626 B2 * | 3/2002 | Furukawa | 324/429 |
| 6,377,030 B1 | 4/2002 | Asao et al. | |
| 6,411,063 B1 | 6/2002 | Kouzu et al. | |
| 6,472,880 B1 | 10/2002 | Kang | |
| 6,495,989 B1 * | 12/2002 | Eguchi | 320/132 |
| 6,621,250 B1 | 9/2003 | Ohkubo et al. | |
| 6,639,409 B2 * | 10/2003 | Morimoto et al. | 324/434 |
| 6,803,766 B2 * | 10/2004 | Kobayashi et al. | 324/434 |
| 7,126,342 B2 | 10/2006 | Iwabuchi et al. | |
| 7,332,891 B2 * | 2/2008 | Sugimoto | 320/116 |
| 2001/0035737 A1 | 11/2001 | Nakanishi et al. | |
| 2002/0030494 A1 | 3/2002 | Araki et al. | |
| 2002/0113595 A1 | 8/2002 | Sakai et al. | |
| 2003/0025481 A1 | 2/2003 | Bertness | |
| 2003/0146737 A1 | 8/2003 | Kadouchi et al. | |
| 2003/0189419 A1 | 10/2003 | Maki et al. | |
| 2004/0109274 A1 | 6/2004 | Sato | |
| 2005/0156603 A1 | 7/2005 | Lin et al. | |
| 2005/0269991 A1 | 12/2005 | Mitsui et al. | |
| 2006/0028179 A1 | 2/2006 | Yudahira et al. | |
| 2006/0181245 A1 | 8/2006 | Mizuno et al. | |
| 2006/0202663 A1 | 9/2006 | Cho et al. | |
| 2007/0090802 A1 | 4/2007 | Seo | |
| 2007/0090803 A1 | 4/2007 | Yun et al. | |

FOREIGN PATENT DOCUMENTS

| | | |
|---|---|---|
| CN | 1604383 A | 4/2005 |
| EP | 0990913 A1 | 4/2000 |
| EP | 1081499 A1 | 3/2001 |
| EP | 1203964 A2 | 5/2002 |
| EP | 1841003 A1 | 10/2007 |
| JP | 06231806 | 8/1994 |
| JP | 11160367 | 6/1999 |
| JP | 2000-069606 | 3/2000 |
| JP | 2000-134705 | 5/2000 |
| JP | 2000-217261 | 8/2000 |
| JP | 2000-228832 | 8/2000 |
| JP | 2000324702 | 11/2000 |
| JP | 2000-340267 | 12/2000 |
| JP | 2000-357541 | 12/2000 |
| JP | 2001-086656 | 3/2001 |
| JP | 2001-116776 | 4/2001 |
| JP | 2002-042906 | 2/2002 |
| JP | 2002-199510 | 7/2002 |
| JP | 2003-084015 | 3/2003 |
| JP | 2003134675 | 5/2003 |
| JP | 2004-079324 | 3/2004 |
| JP | 2004-180397 | 6/2004 |
| JP | 2004222433 | 8/2004 |
| JP | 2005-269752 | 9/2005 |
| JP | 2006-014480 | 1/2006 |
| JP | 2006-047130 | 2/2006 |
| KR | 19920009697 | 9/1989 |
| KR | 1997-0048597 A | 7/1997 |
| KR | 1998064646 | 10/1998 |
| KR | 0216808 B1 | 6/1999 |
| KR | 2001-0043872 A | 5/2001 |
| KR | 20020064998 | 8/2002 |
| KR | 2003-0065757 A | 8/2003 |
| KR | 20040005133 | 1/2004 |
| KR | 10-2004-0092943 | 11/2004 |
| KR | 20040111144 | 12/2004 |
| KR | 2005-0019856 A | 3/2005 |
| KR | 2005-0026360 A | 3/2005 |
| KR | 20050089816 | 9/2005 |
| KR | 0534818 A | 12/2005 |
| KR | 2006-0059680 A | 6/2006 |
| KR | 2006-0079505 A | 7/2006 |
| KR | 2006-0094897 A | 8/2006 |
| KR | 20070003628 | 1/2007 |
| KR | 2007-0029937 A | 3/2007 |
| WO | 2007007655 | 1/2007 |

OTHER PUBLICATIONS

Custom power solutions (10 pages) print out from http://www.mpoweruk.com/soc.htm.

* cited by examiner

BATTERY MANAGEMENT SYSTEM AND BATTERY MANAGEMENT METHOD

CLAIMS OF PRIORITY

This application makes reference to, incorporates the same herein, and claims all benefits accruing under 35 U.S.C. §119 from an application for BATTERY MANAGEMENT SYSTEM AND METHOD FOR MEASURING CELL VOLTAGE OF THE BATTERY earlier filed in the Korean Intellectual Property Office on the 20 Oct. 2005 and there duly assigned Serial No. 10-2005-0099087.

BACKGROUND OF THE INVENTION

1. Technical Field

The present invention relates to a battery management system and a battery management method. More particularly, the present invention relates to a battery management system and method for a vehicle utilizing electrical energy.

2. Related Art

Vehicles using a gasoline or heavy oil internal combustion engine have caused serious air pollution. Accordingly, various attempts to develop electric or hybrid vehicles have recently been made in order to reduce air pollution.

An electric vehicle uses a battery engine run by electrical energy outputted by a battery. Since the electric vehicle mainly uses a battery formed by one battery pack including a plurality of rechargeable/dischargeable secondary cells, there is merit in that it has no emission gases and less noise.

The term "hybrid vehicle" commonly refers to a gasoline-electric hybrid vehicle which uses gasoline to power an internal combustion engine and an electric battery to power an electric motor. Recently, hybrid vehicles using an internal combustion engine and fuel cells and hybrid vehicles using a battery and fuel cells have been developed. The fuel cells directly obtain electrical energy by generating a chemical reaction while hydrogen and oxygen are continuously provided.

Since battery performance directly affects a vehicle using electrical energy, it is required that each battery cell have superior performance. Also, it is required that a battery management system for measuring voltage and current of the overall battery so as to efficiently manage charging/discharging operations of each battery cell be provided.

The above information is provided only for an enhancement of understanding of the background of the invention, and therefore it may contain information that does not form the prior art already known in this country to a person of ordinary skill in the art.

SUMMARY OF THE INVENTION

The present invention has been developed in an effort to provide a battery management system having the advantage of more efficiently measuring battery cell voltage using a small number of elements.

An exemplary embodiment of the present invention provides a battery management system capable of measuring a pack current and a pack voltage while a plurality of cell voltages are measured. The battery management system is coupled to a battery in which a plurality of battery cells are formed as one pack.

The battery includes a first sub-pack having first and second battery cells among the plurality of battery cells, and the battery management system comprises:

first and second relays coupled to respective output terminals of the first and second battery cells of the first sub-pack for transmitting cell voltages to the same in response to respective first and second control signals;

a third relay for transmitting the cell voltage received through one of the first and second relays in response to a third control signal;

a first charging unit for storing the cell voltage transmitted from the third relay;

a fourth relay for transmitting the cell voltage stored in the first charging unit in response to a fourth control signal; and an A/D converter for converting the transmitted cell voltage of the fourth relay into digital data.

The battery may further include a second sub-pack having third and fourth battery cells among the plurality of battery cells, and the battery management system further comprises:

fifth and sixth relays coupled to respective output terminals of the third and fourth battery cells of the second sub-pack for transmitting cell voltages to the same in response to the respective first and second control signals;

a seventh relay for transmitting the transmitted cell voltage of any one of the fifth and sixth relays in response to the third control signal;

a second charging unit for storing the cell voltage transmitted from the seventh relay; and an eighth relay for transmitting the stored cell voltage of the second charging unit in response to the fourth control signal;

wherein the A/D converter converts the cell voltages transmitted through the eighth relay into digital data.

Another exemplary embodiment of the present invention provides a battery management system which comprises:

a battery including first, second, and third sub-packs respectively having first and second battery cells among a plurality of battery cells;

a pack voltage measurer for measuring a pack voltage of the battery;

a pack current measurer for measuring a pack current of the battery;

a cell voltage measurer for respectively measuring cell voltages of the plurality of battery cells; and an A/D converter including first, second, and third input terminals for receiving the outputs of the cell voltage measurer, a fourth input terminal for receiving the output of the pack voltage measurer, and a fifth input terminal for receiving the output of the pack current measurer and for sequentially converting the input signals of the first, second, third, fourth, and fifth input terminals into digital data;

wherein the cell voltage measurer includes:

a first charging unit for storing a cell voltage of any one of the first and second battery cells of the first sub-pack;

a second charging unit for storing a cell voltage of one of the first and second battery cells of the second sub-pack;

a third charging unit for storing a cell voltage of one of the first and second battery cells of the third sub-pack; and first, second, and third relays for transmitting the cell voltages stored in the first, second, and third charging units to the first, second, and third input terminals of the A/D converter in response to a first control signal.

The cell voltage measurer includes:

fourth and fifth relays for transmitting the cell voltages by being coupled to each output terminal of the first and second battery cells of the first sub-pack in response to the respective second and third control signals;

a sixth relay for transmitting the cell voltage transmitted through one of the fourth and fifth relays in response to a fourth control signal to the first charging unit;

seventh and eighth relays for transmitting the cell voltages by being coupled to each output terminal of the first and second battery cells of the second sub-pack in response to the respective second and third control signals;

a ninth relay for transmitting the cell voltage transmitted through one of the seventh and eighth relays in response to the fourth control signal to the second charging unit;

tenth and eleventh relays for transmitting the cell voltages by being coupled to each output terminal of the first and second battery cells of the third sub-pack in response to the respective second and third control signals; and a twelfth relay for transmitting the cell voltage transmitted through one of the tenth and eleventh relays in response to the fourth control signal to the third charging unit.

Another exemplary embodiment of the present invention provides a driving method for a battery management system which includes at least one pack having a plurality of cells. The driving method includes: a) measuring a voltage of at least one cell among the plurality of cells; b) measuring a voltage and a current of the pack; c) measuring a voltage of at least one cell among the plurality of cells except the at least one cell of which the voltage is already measured; and d) measuring again the voltage and the current of the pack.

Another exemplary embodiment of the present invention provides a driving method for a battery management system in which the battery is formed with one pack having at least N×M battery cells (where N is a natural number and M is a natural number greater than 3). The driving method includes: a) measuring a cell voltage of an (N+1)-th battery cell; b) measuring a cell voltage of a (2N+1)-th battery cell; c) measuring the pack voltage and current of the battery; and d) measuring a cell voltage of a (3N+1)-th battery cell.

Another exemplary embodiment of the present invention provides a driving method for a battery management system in which the battery is formed with one pack having at least N×M battery cells (where N is a natural number and M is a natural number greater than 3). The driving method includes:

respectively charging first, second, and third charging units with cell voltages of (N+1)-th, (2N+1)-th and (3N+1)-th battery cells; b) measuring the cell voltage of the (N+1)-th battery cell based on the charged voltage of the first charging unit; c) measuring the cell voltage of the (2N+1)-th battery cell based on the charged voltage of the second charging unit; d) measuring the pack voltage and the current of the battery; and e) measuring the cell voltage of the (3N+1)-th battery cell based on the charged voltage of the third charging unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, when it is described that an element is coupled to another element, the element may be directly coupled to the other element or electrically coupled to the other element through a third element. Throughout this specification and the claims which follow, unless explicitly described to the contrary, the words "comprise" or "include", or variations such as "comprises" or "includes", or "comprising" or "including", will be understood to imply the inclusion of stated elements but not the exclusion of any other elements.

Figure 1:
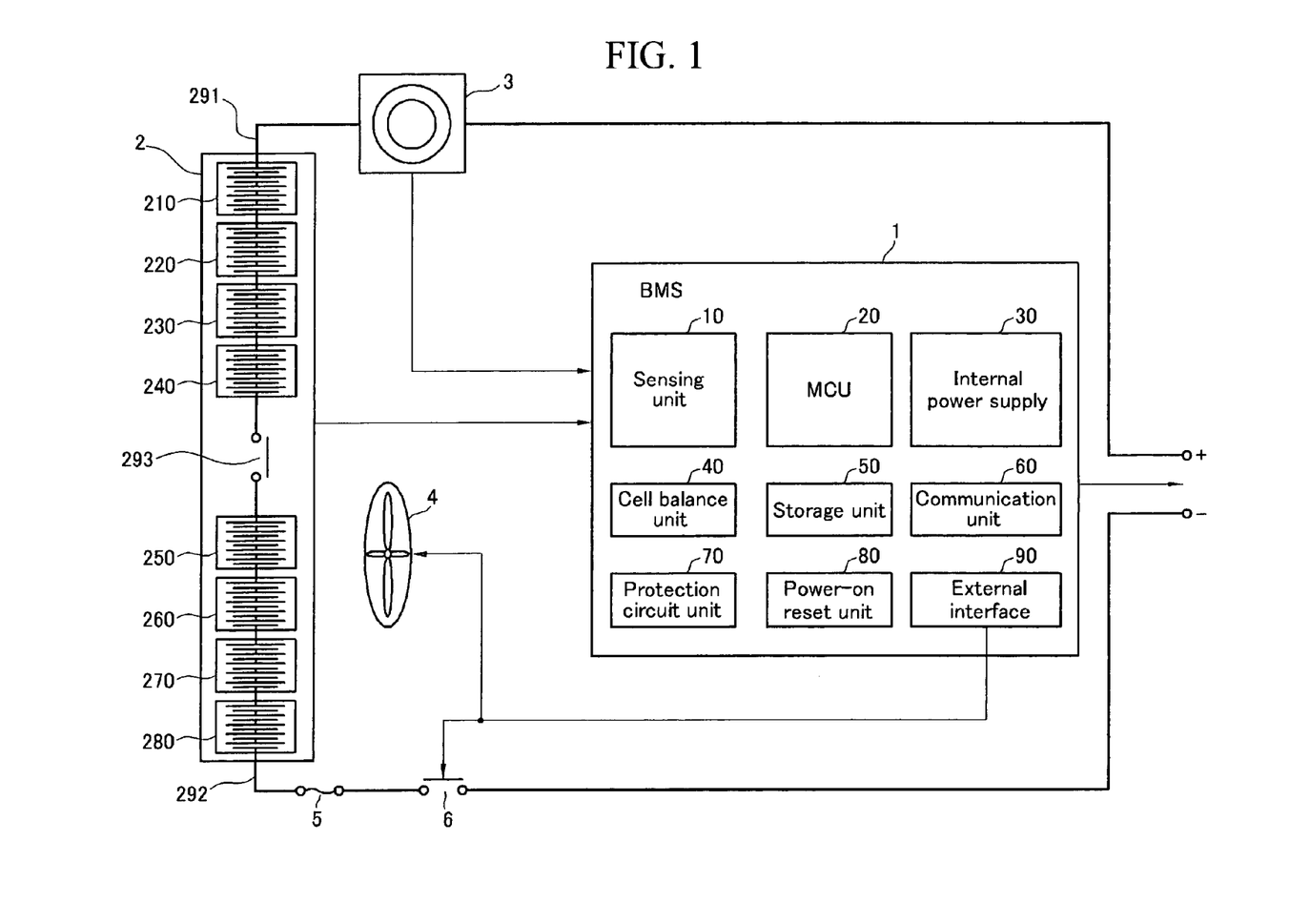
FIG. 1 schematically illustrates a battery, a battery management system (BMS), and peripheral devices thereof.

FIG. 1 schematically illustrates a battery, a battery management system (BMS), and peripheral devices thereof.

As shown in FIG. 1, a BMS 1, a battery 2, a current sensor 3, a cooling fan 4, a fuse 5, and a main switch 6 are included. The current sensor 3 measures an output current of the battery 2 and outputs the same to the BMS 1. The cooling fan 4 cools heat generated by the charging/discharging of the battery 2 in response to a control signal of the BMS 1, and prevents the charge/discharge efficiency of the battery 2 from being deteriorated and reduced due to an increase in temperature. The fuse 5 prevents an overflow current due to a disconnection or a short circuit of the battery 2 from being transmitted to a power generator (not shown). That is, if the overflow current occurs, the fuse 5 is disconnected to interrupt the transmission of the overflow current. The main switch 6 turns on/off the battery 2 in response to the control signal of the BMS 1 when an abnormal phenomenon, including an overvoltage, an overflow current, and a high temperature, occurs.

The battery 2 includes eight sub-packs 210 to 280 coupled in series with each other, output terminals 291 and 292, and a safety switch 293 provided between the sub-packs 240 and 250. The sub-pack 210 includes five secondary battery cells coupled in series with each other. Likewise, the respective sub-packs 220 to 280 include five secondary battery cells coupled in series with each other, and accordingly, the battery 2 includes a total of 40 battery cells.

In this regard, for better comprehension and ease of description of the present exemplary embodiment, it is one example that the sub-packs 210 to 280 are expressed as having a group of five secondary batteries. However, the battery 2 may include 40 secondary battery cells directly coupled to each other without the sub-packs 210 to 280.

The output terminals 291 and 292 are coupled to a power generator (not shown) of the vehicle and supply electrical energy to an engine thereof. The safety switch 293 is a switch provided between the sub-packs 240 and 250, and it is manually turned on/off so as to protect a worker when the worker replaces or handles the battery 2. In this embodiment, the safety switch 293 may be provided between the sub-packs 240 and 250, but it is not limited thereto.

The BMS 1 includes a sensing unit 10, a main control unit (MCU) 20, an internal power supply 30, a cell balance unit 40, a storage unit 50, a communication unit 60, a protection circuit unit 70, a power-on reset unit 80, and an external interface 90.

The sensing unit 10 measures an overall battery pack current, an overall battery pack voltage, each battery cell voltage, each battery cell temperature, and a peripheral temperature, converts the measured values into digital data, and transmits the measured values to the MCU 20.

The MCU 20 determines a state of charging (SOC) and a state of health (SOH) with respect to the battery 2 based on the measured values transmitted from the sensing unit 10, and controls the charging/discharging of the battery 2.

The internal power supply 30 supplies power to the BMS 1 using a backup battery.

The cell balance unit 40 checks the balance of the charging state of each cell. That is, cells of a relatively high charged state may be discharged, and cells of a relatively low charged state may be charged.

The storage unit 50 stores data of the present SOC, SOH, or the like when the power source of the BMS 1 is turned off. Herein, the storage unit 50 may be an electrically erasable and programmable read-only memory (EEPROM) as an electrically erasable and writable non-volatile memory.

The communication unit 60 communicates with a controller (not shown) of the power generator of the vehicle.

The protection circuit 70 protects the battery 2 from an external impact, an overflow current, a low voltage, or the like, using firmware.

The power-on reset unit 80 resets the overall system when the power source of the BMS 1 is turned on.

The external interface 90 couples the BMS auxiliary devices, including the cooling fan 4 and the main switch 6, to the MCU 20. In the present exemplary embodiment, the cooling fan 4 and the main switch 6 are illustrated as auxiliary devices of the BMS 1, but this is not restrictive.

Figure 2:
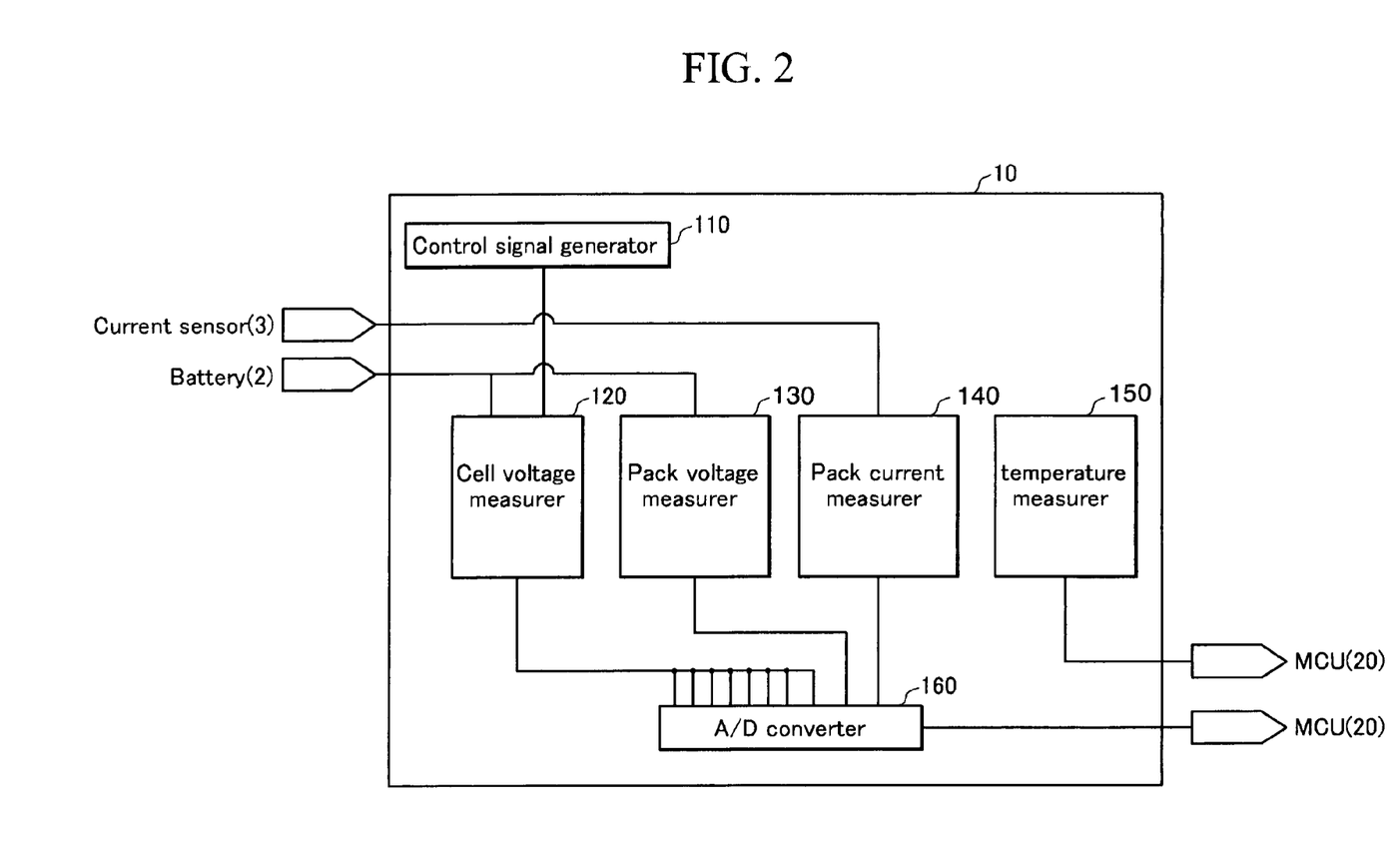
FIG. 2 schematically illustrates a sensing unit according to an exemplary embodiment of the present invention.
Figure 3:
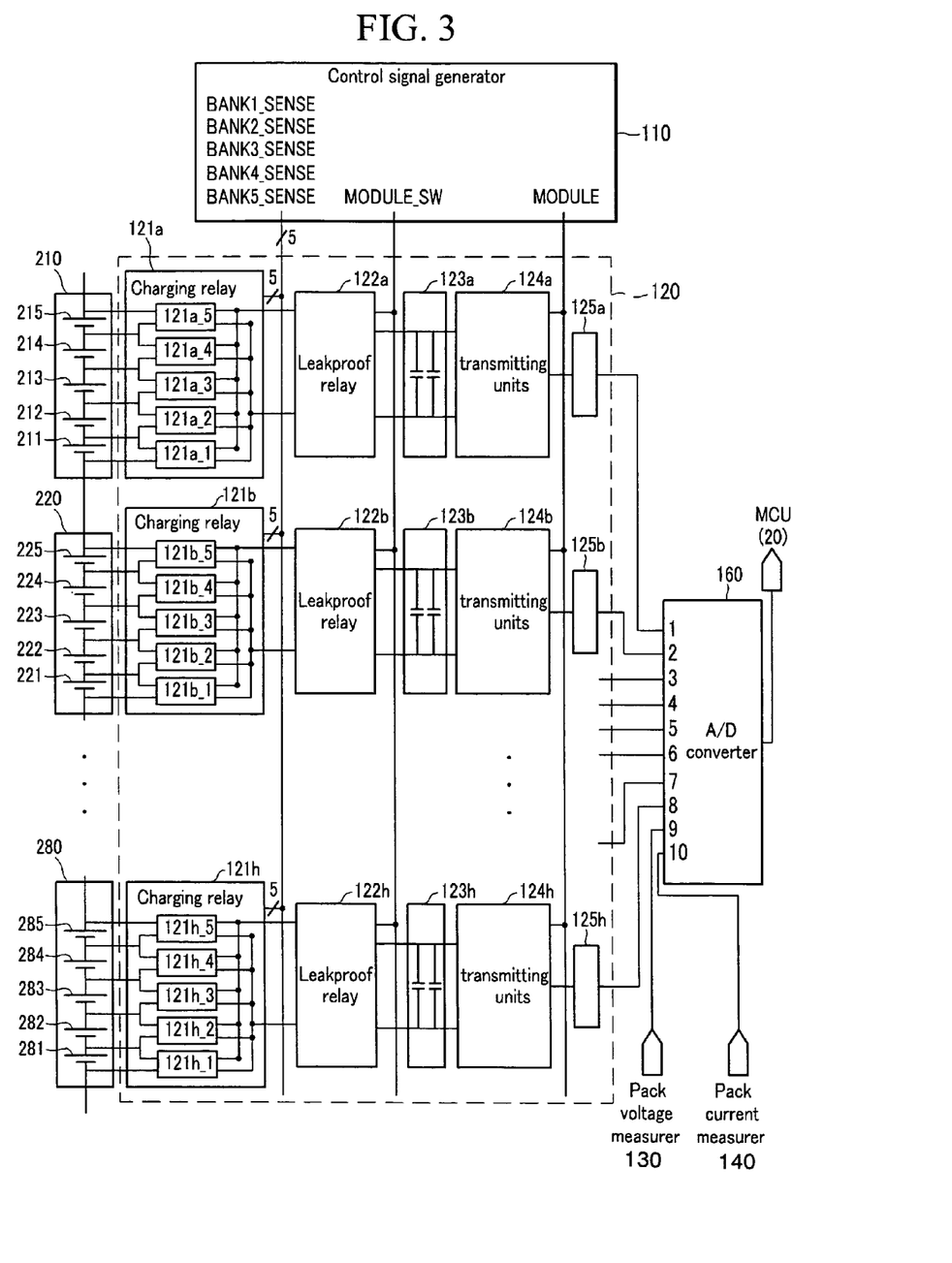
FIG. 3 illustrates in detail a cell voltage measurer.

FIG. 2 schematically illustrates a sensing unit according to an exemplary embodiment of the present invention, and FIG. 3 illustrates in detail a cell voltage measurer.

As shown in FIG. 2, the sensing unit 10 includes a control signal generator 110, a cell voltage measurer 120, a pack voltage measurer 130, a pack current measurer 140, a temperature measurer 150, and an A/D converter 160.

The control signal generator 110 generates control signals BANK1_SENSE to BANK5_SENSE, MODULE_SW, and MODULE (see FIG. 3), and outputs these control signals to the cell voltage measurer 120 so that the cell voltage measurer 120 sequentially measures voltages of the 40 battery cells. Herein, the five control signals BANK1_SENSE to BANK5_SENSE are sequential on-signals, the control signal MODULE_SW becomes an on-signal when any one of the five control signals BANK1_SENSE to BANK5_SENSE becomes an on-signal, and the control signal MODULE becomes an on-signal when all of the control signals BANK1_SENSE to BANK5_SENSE and the control signal MODULE_SW become off-signals.

The cell voltage measurer 120 measures analog voltages of the 40 battery cells 211 to 285 (see FIG. 3) of the battery 2, and outputs the measured analog voltages to the A/D converter 160. The pack voltage measurer 130 measures an analog voltage value between the output terminals 291 and 292 (see FIG. 1) of the battery 2, and outputs the measured analog voltage to the A/D converter 160. The pack current measurer 140 receives the current value measured from the current sensor 3 (see FIG. 1), converts the received current value into an analog voltage signal, and outputs the converted value to the A/D converter 160. The A/D converter 160 converts the analog values received from the cell voltage measurer 120, the pack voltage measurer 130, and the pack current measurer 140 into digital data, and outputs the converted digital data to the MCU 20 (see FIG. 1). Specifically, the A/D converter 160 includes 10 input terminals and sequentially converts each input analog data of the input terminals into digital data. Herein, among the 10 input terminals, 8 input terminals (referred to as first to eighth input terminals) are coupled to the output terminal of the cell voltage measurer 120, another input terminal (referred to as a ninth input terminal) is coupled to the pack voltage measurer 130, and the remaining input terminal (referred to as a tenth input terminal) is coupled to the pack current measurer 140.

In addition, the temperature measurer 150 (see FIG. 2) measures temperatures of the battery 2 and the surrounding environment thereof in digital values, and outputs the measured digital values to the MCU 20.

Figure 4:
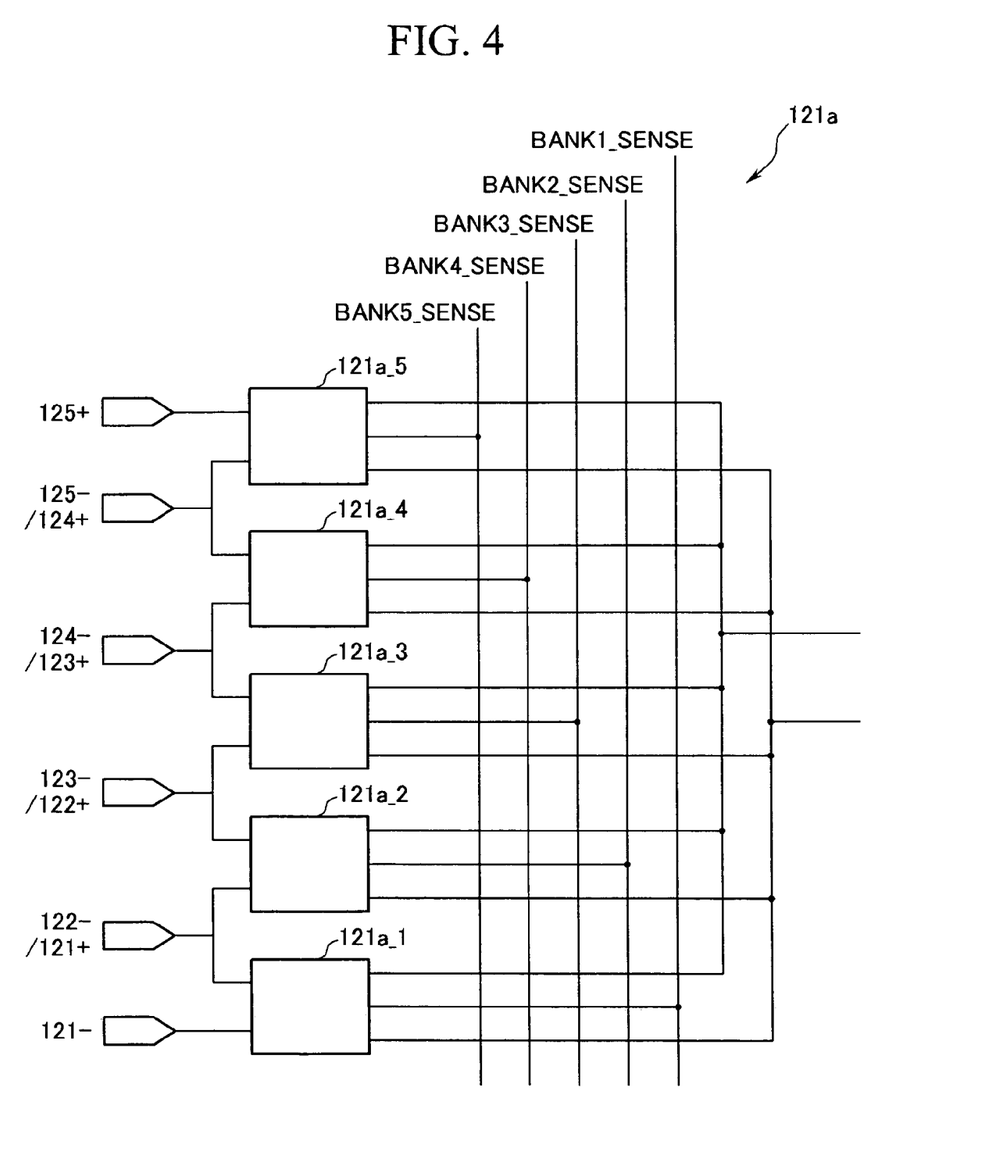
FIG. 4 illustrates in detail a charging relay unit of the cell voltage measurer of FIG. 3.

FIG. 4 illustrates in detail a charging relay unit of the cell voltage measurer of FIG. 3.

In FIG. 3, the sub-packs 230 to 270 provided between the sub-packs 220 and 280 are not illustrated for simplification and clarification of the drawing. Likewise, charging relays 121*c* to 121*g*, leakproof relays 122*c* to 122*g*, charging units 123*c* to 123*g*, transmitting units 124*c* to 124*g*, and buffers 125*c* to 125*g* are not illustrated in order to abbreviate the drawing.

As shown in FIG. 3, the cell voltage measurer 120 includes charging relays 121*a* to 121*h* respectively coupled to the sub-packs 210 to 280, leakproof relays 122*a* to 122*h*, charging units 123*a* to 123*h*, transmitting units 124*a* to 124*h*, and buffers 125*a* to 125*h*.

The charging relay 121*a* includes five cell relays 121*a*_1 to 121*a*_5, which are respectively on/off based on the five control signals BANK1_SENSE to BANK5_SENSE outputted from the control signal generator 110. In this regard, the control signals BANK1_SENSE to BANK5_SENSE are for sequentially turning on the cell relays during a predetermined time.

Specifically, as shown in FIG. 4, the cell relay 121*a*_1 is coupled to negative and positive terminals 121− and 121+ of the cell 211, is turned on based on the input control signal BANK1_SENSE, and transmits a voltage of the cell 211.

The cell relay 121*a*_2 is coupled to negative and positive terminals 122− and 122+ of the cell 212, is turned on based on the input control signal BANK2_SENSE, and transmits a voltage of the cell 212. Likewise, the cell relays 121*a*_3 to 121*a*_5 are turned on based on the input control signals BANK3_SENSE to BANK5_SENSE, respectively, and transmit voltages of the cells 213 to 215.

The leakproof relay 122*a* (FIG. 3) transmits an output voltage of the charging relay 121*a* to the charging unit 123*a* based on the control signal MODULE_SW transmitted from the control signal generator 110. Herein, the leakproof relay 122*a* is turned on and the charging unit 123*a* is charged with the cell voltage when any one of the cell relays 121*a*_1 to 121*a*_5 of the charging relay 121*a* is turned on. Then, the leakproof relay 122*a* is turned off, and accordingly, the stored cell voltage of the charging unit 123*a* is prevented from being leaked into the charging relay 121*a*.

The charging unit 123*a* includes at least one capacitor, and is charged with the cell voltage transmitted from the leakproof relay 122*a*.

The transmitting unit 124*a* is turned on based on the control signal MODULE transmitted from the control signal generator 110, and outputs the stored cell voltage of the charging unit 123*a* to the buffer 125*a*. Since the control signal MODULE becomes an on-signal when the control signals BANK1_SENSE to BANK5_SENSE and the control signal MODULE_SW become off-signals, the transmitting unit 124a is on when the leakproof relay 122a and the cell relays 121a_1 to 121a_5 are off after one of the leakproof relay 122a and the cell relays 121a_1 to 121a_5 of the charging relay 121a is on so that the charging unit 123a is charged with the cell voltage.

The buffer 125a clamps the output cell voltage of the transmitting unit 124a in the range of a predetermined voltage, and outputs the clamped voltage to the first input terminal of the A/D converter 160.

Meanwhile, the structure and operation of the charging relays 121b to 121h, the leakproof relays 122b to 122h, the charging units 123b to 123h, the transmitting units 124b to 124h, and the buffers 125b to 125h are respectively the same as those of the charging relay 121a, the leakproof relay 122a, the charging unit 123a, the transmitting unit 124a, and the buffer 125a. Accordingly, the structure and operation thereof will be not described.

The operation of the cell voltage measurer 120 will be described with reference to FIG. 3 to FIG. 5.

Figure 5:
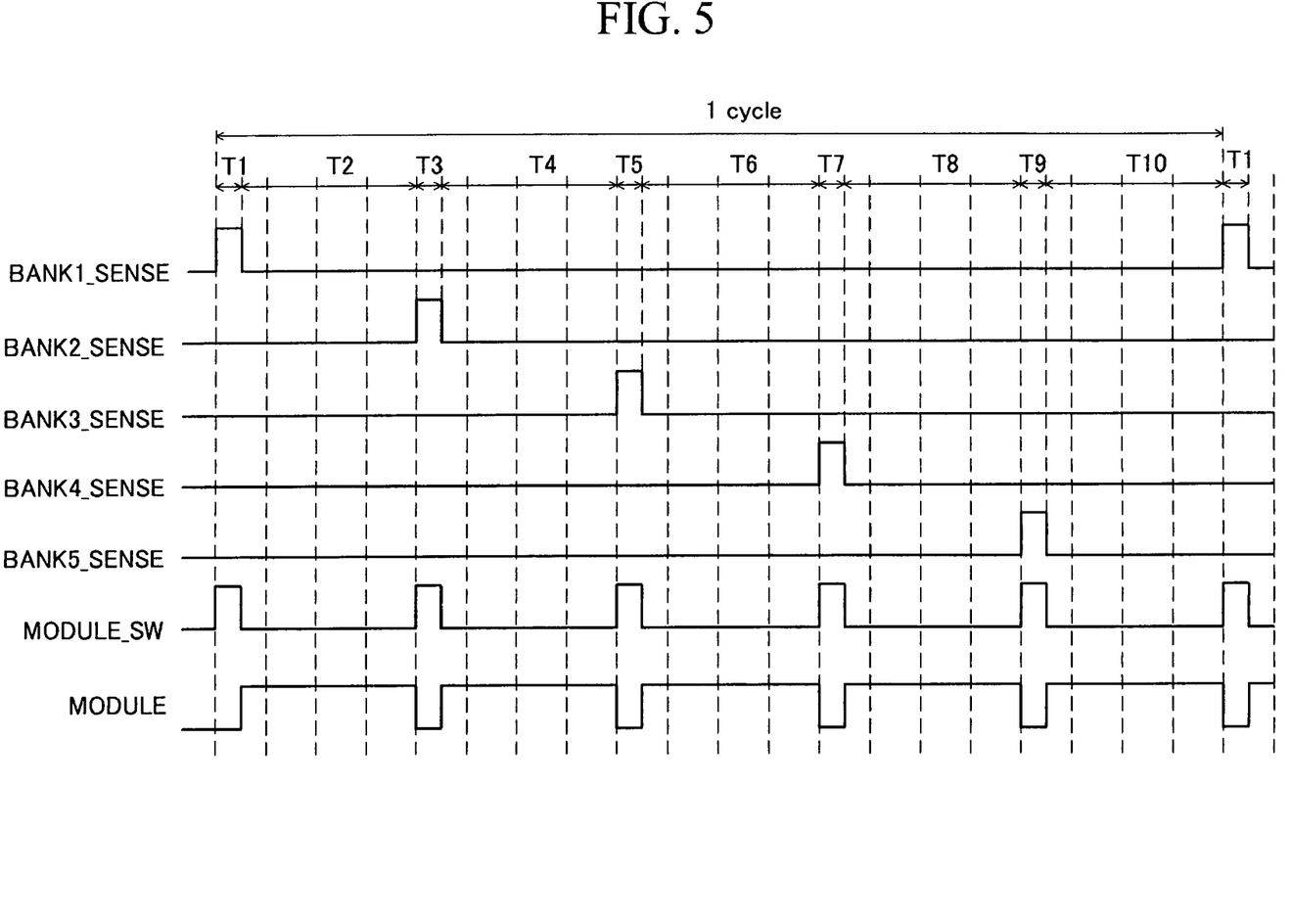
FIG. 5 is a timing diagram showing a control signal according to an exemplary embodiment of the present invention.

FIG. 5 is a timing diagram showing a control signal according to an exemplary embodiment of the present invention.

In this embodiment, as one example, the control signal generator 110 is described as outputting a high level signal as the on-signal and a low level signal as the off-signal, but the invention is not limited thereto. In addition, in FIG. 5, a time T2 is illustrated as being shorter than its actual length in order to abbreviate the drawing although the time T2 must be illustrated as being longer than a time T1 because the time T2 corresponds to about 20 times the time T1.

First, during the time T1, the control signals BANK1_SENSE and MODULE_SW are given as the high level and the control signals BANK2_SENSE to BANK5_SENSE and MODULE are given as the low level. Accordingly, the cell relay 121a_1 of the charging relay 121a is turned on by the high level of the control signal BANK1_SENSE, and the cell relays 121a_2 to 121a_5 are turned off by the low level of the control signals BANK2_SENSE to BANK5_SENSE. In addition, the leakproof relay 122a is turned on by the high level of the control signal MODULE_SW, and the transmitting unit 124a is turned off by the low level of the control signal MODULE. Accordingly, the voltage of the cell 211 is stored in the charging unit 123a through the charging relay 121a and the leakproof relay 122a.

Likewise, the cell relays 121b_1, 121c_1, 121d_1, 121e_1, 121f_1, 121g_1 and 1121h_1, and the leakproof relays 122b, 122c, 122d, 122e, 122f, 122g, and 122h, respectively, are turned on, and accordingly, the voltages of the cells 221, 231, 241, 251, 261, 271, and 281 are respectively stored in the charging units 123b, 123c, 123d, 123e, 123f, 123g, and 123h. Herein, the time T1 may be given as 2 ms.

Next, during the time T2, the control signals BANK1_SENSE to BANK5_SENSE and MODULE_SW are designated low level, and the control signal MODULE is given as the high level. Accordingly, the cell relay 121a_1 is turned off by the low level of the control signal BANK1_SENSE, and the leakproof relay 122a is turned off by the low level of the control signal MODULE_SW. The transmitting unit 124a is turned on by the high level of the control signal MODULE, and accordingly, the voltage of the cell 211 stored in the charging unit 123a is transmitted through the buffer 125a to the first input terminal of the A/D converter 160.

Likewise, the respectively stored voltages of the cells 221, 231, 241, 251, 261, 271, and 281 of the charging units 123b, 123c, 123d, 123e, 123f, 123g, and 123h are respectively transmitted by the transmitting units 124b, 124c, 124d, 124e, 124f, 124g, and 124h through the buffers 125b, 125c, 125d, 125e, 125f, 125g, and 125h to the second to eighth input terminals of the A/D converter 160. In addition, the ninth and tenth input terminals of the A/D converter 160 receive the outputs of the pack voltage measurer 130 and the pack current measurer 140.

The A/D converter 160 sequentially reads the first input terminal, the second input terminal, the ninth input terminal, the tenth input terminal, the third input terminal, the fourth input terminal, the ninth input terminal, the tenth input terminal, the fifth input terminal, the sixth input terminal, the ninth input terminal, the tenth input terminal, the seventh input terminal, the eighth input terminal, the ninth input terminal, and the tenth input terminal (a total of 16 times) and changes the read data into digital data during the time T2. Assuming that it takes 2.5 ms for the A/D converter 160 to read one input terminal and change the read data into digital data, the time T2 may be continued for 40 ms (2.5 ms×16) so as to read data 16 times.

Consequently, the cell voltages of the respective first cells included in the eight sub-packs 210 to 280 may be measured during the times T1 and T2, and accordingly, the total time for measuring the cell voltages may be given as 42 ms.

Likewise, the cell voltages of the second cells respectively included in the eight sub-packs 210 to 280 may be measured during the times T3 and T4.

First, during the time T3, the control signals BANK2_SENSE and MODULE_SW are given as the high level and the control signals BANK1_SENSE, BANK3_SENSE to BANK5_SENSE, and MODULE are given as the low level. Accordingly, the cell relay 121a_2 of the charging relay 121 is turned on by the high level of the control signal BANK2_SENSE, and the cell relays 121a_1 and 121a_3 to 121a_5 are turned off by the low level of the control signals BANK1_SENSE and BANK3_SENSE to BANK5_SENSE. At this point, the leakproof relay 122a is turned on by the high level of the control signal MODULE_SW, and accordingly, the cell voltage of the cell 212 is stored in the charging unit 123a.

Likewise, the cell relays 121b_2, 121c_2, 121d_2, 121e_2, 121f_2, 121g_2, and 121h_2 and the leakproof relays 122b, 122c, 122d, 122e, 122f, 122g, and 122h are turned on, and accordingly, the voltages of the cells 222, 232, 242, 252, 262, 272, and 282 are stored in the charging units 123b, 123c, 123d, 123e, 123f, 123g, and 123h, respectively. Herein, the time T3 may be given as 2 ms.

Next, during the time T4, the control signals BANK1_SENSE to BANK5_SENSE and MODULE_SW are given as the low level and the control signal MODULE is given as the high level. Accordingly, the cell relay 121a_2 is turned off by the low level of the control signal BANK2_SENSE, and the leakproof relay 122a is turned off by the low level of the control signal MODULE_SW. In addition, the transmitting unit 124a is turned on by the high level of the control signal MODULE, and accordingly, the voltage of the cell 212 stored in the charging unit 123a is transmitted though the buffer 125a to the first input terminal of the A/D converter 160.

Likewise, the voltages of the cells 222, 232, 242, 252, 262, 272, 282 stored in the charging units 123b, 123c, 123d, 123e, 123f, 123g, and 123h, respectively, are transmitted through the transmitting units 124b, 124c, 124d, 124e, 124f, 124g, and 124h, respectively, to the second to eighth input terminals of the A/D converter 160. The ninth and tenth input terminals of the A/D converter 160 receive the outputs of the pack voltage measurer 130 and the pack current measurer 140.

Accordingly, the A/D converter 160 sequentially reads the first input terminal, the second input terminal, the ninth input terminal, the tenth input terminal, the third input terminal, the fourth input terminal, the ninth input terminal, the tenth input terminal, the fifth input terminal, the sixth input terminal, the ninth input terminal, the tenth input terminal, the seventh input terminal, the eighth input terminal, the ninth input terminal, and the tenth input terminal (a total of 16 times) and converts the read data into digital data. Assuming that it takes 2.5 ms for the A/D converter 160 to read one input terminal and change the read data into digital data, the time T4 may be continued for 40 ms (2.5 ms×16) so as to read data 16 times.

In addition, the A/D converter 160 outputs the input cell voltages of the first and second input terminals, outputs the input pack voltage and the input pack current of the ninth and tenth input terminals, and then outputs the input cell voltages of the third and fourth input terminals. Such an operation of the A/D converter is repeatedly performed. In such a manner, the pack voltage and current may be measured many times during the measuring of the entire cell voltage, so that the MCU 20 of the BMS 1 may exactly expect the state of the battery, such as SOC and SOH.

Meanwhile, in the same manner as in the times (T1 and T2) and (T3 and T4), each cell voltage of each third, fourth, and fifth cells of the respective sub-packs 210 to 280 may be measured during the times (T5 and T6), (T7 and T8), and (T9 and T10).

Therefore, a total time of one cycle for measuring all of the cell voltages of the 40 cells of the 8 sub-packs may be given as 210 ms, that is, as 5 times the time T1 and T2 (i.e., 42 ms×5). The A/D converter 160 outputs the cell voltages of the 40 cells, measured in this manner, to the MCU 20 (see FIG. 1).

As such, the cell voltages of the battery 2 may be more exactly and finely measured. It is one example that the BMS 1 according to an exemplary embodiment of the present invention measures each cell voltage between respective two packs among the plurality of packs, and then measures the pack voltage and current, but the invention is not limited thereto. Accordingly, one cell voltage of the pack may be measured, and the pack voltage and current thereof may be measured.

According to an exemplary embodiment of the present invention, the plurality of cell relays are coupled to the positive and negative terminals of the respective cells, the outputs of the plurality of cell relays are transmitted through one leakproof relay, and accordingly, the cell voltage may be measured, thereby reducing the number of elements used in the cell voltage measurer of the BMS.

The plurality of cell relays are sequentially turned on by the same number of control signals as that of the cell relays coupled to the one leakproof relay, thereby sequentially measuring the plurality of cell voltages.

In addition, when the charging unit is charged with the cell voltage and then the leakproof relay is turned off, the charged cell voltage may be prevented from leakage, thereby more exactly measuring a cell voltage.

According to an exemplary embodiment of the present invention, the entire pack voltage and pack current may be measured while the cell voltages are measured, thereby reducing a measuring period of the pack voltage and the pack current.

While this invention has been described in connection with what is presently considered to be practical exemplary embodiments, it is to be understood that the invention is not limited to the disclosed embodiments, but, on the contrary, it is intended to cover various modifications and equivalent arrangements included within the spirit and scope of the appended claims.

What is claimed is:

1. A battery management system coupled to a battery in which a plurality of battery cells are formed as one pack, wherein the battery includes a first sub-pack having first and second battery cells among the plurality of battery cells, said battery management system including a cell voltage measurer for measuring analog voltages of the battery cells, a pack voltage measurer for measuring an analog voltage value between output terminals of the battery, and a pack current measurer for measuring a pack current of the battery;

said cell voltage measurer comprising:

first and second relays coupled to respective output terminals of the first and second battery cells of the first sub-pack for transmitting cell voltages to the respective output terminals of the first and second battery cells of the first sub-pack in response to respective first and second control signals;

a third relay for transmitting the cell voltage received through one of the first and second relays in response to a third control signal;

a first charging unit for storing the cell voltage transmitted from the third relay;

a fourth relay for transmitting the cell voltage stored in the first charging unit in response to a fourth control signal; and an A/D converter for converting the transmitted cell voltage of the fourth relay into digital data;

wherein the A/D converter comprises first, second, and third input terminals for receiving the outputs of the cell voltage measurer, a fourth input terminal for receiving the output of the pack voltage measurer, and a fifth input terminal for receiving the output of the pack current measurer, and wherein the A/D converter sequentially converts the input signals of the first, second, fourth, fifth and third input terminals into digital data.

2. The battery management system of claim 1, wherein the battery further includes a second sub-pack having third and fourth battery cells among the plurality of battery cells, battery management system further comprising:

fifth and sixth relays coupled to respective output terminals of the third and fourth battery cells of the second sub-pack and for transmitting cell voltages to the respective output terminals of the third and fourth cells of the second sub-pack in response to the respective first and second control signals;

a seventh relay for transmitting the transmitted cell voltage of any one of the fifth and sixth relays in response to the third control signal;

a second charging unit for storing the cell voltage transmitted from the seventh relay; and an eighth relay for transmitting the stored cell voltage of the second charging unit in response to the fourth control signal;

wherein the A/D converter converts the cell voltages transmitted through the eighth relay into digital data.

3. The battery management system of claim 2, wherein:

the A/D converter converts the cell voltage of the first battery cell of the first sub-pack transmitted through the fourth relay, and the cell voltage of the third battery cell of the second sub-pack transmitted through the eighth relay, into digital data; and the A/D converter converts the cell voltage of the second battery cell of the first sub-pack transmitted through the fourth relay, and the cell voltage of the fourth battery cell of the second sub-pack transmitted through the eighth relay, into digital data.

4. The battery management system of claim 2, wherein the third control signal is given as an on-signal when the first and second control signals are given as an on-signal.

5. The battery management system of claim 3, wherein the fourth control signal is given as an on-signal when the third control signal is given as an off-signal.

6. The battery management system of claim 3, wherein the fourth control signal is given as an on-signal when the first and second control signals are given as an off-signal.

7. A battery management system, comprising:
a battery including first, second, and third sub-packs having first and second battery cells, respectively, among a plurality of battery cells;
a pack voltage measurer for measuring a pack voltage of the battery;
a pack current measurer for measuring a pack current of the battery;
a cell voltage measurer for respectively measuring cell voltages of the plurality of battery cells; and
an A/D converter including first, second, and third input terminals for receiving the outputs of the cell voltage measurer, a fourth input terminal for receiving the output of the pack voltage measurer, and a fifth input terminal for receiving the output of the pack current measurer, and for sequentially converting the input signals of the first, second, third, fourth, and fifth input terminals into digital data;
wherein the cell voltage measurer comprises: a first charging unit for storing a cell voltage of any one of the first and second battery cells of the first sub-pack;
a second charging unit for storing a cell voltage of one of the first and second battery cells of the second sub-pack;
a third charging unit for storing a cell voltage of one of the first and second battery cells of the third sub-pack; and
first, second, and third relays for transmitting the stored cell voltages of the first, second, and third charging units to the first, second, and third input terminals of the A/D converter in response to a first control signal.

8. The battery management system of claim 7, wherein the cell voltage measurer comprises:
fourth and fifth relays for transmitting the cell voltages by being coupled to each output terminal of the first and second battery cells of the first sub-pack in response to the respective second and third control signals;
a sixth relay for transmitting the cell voltage transmitted through one of the fourth and fifth relays in response to a fourth control signal to the first charging unit;
seventh and eighth relays for transmitting the cell voltages by being coupled to each output terminal of the first and second battery cells of the second sub-pack in response to the respective second and third control signals;
a ninth relay for transmitting the cell voltage transmitted through one of the seventh and eighth relays in response to the fourth control signal to the second charging unit;
tenth and eleventh relays for transmitting the cell voltages by being coupled to each output terminal of the first and second battery cells of the third sub-pack in response to the respective second and third control signals; and
a twelfth relay for transmitting the cell voltage transmitted through one of the tenth and eleventh relays in response to the fourth control signal to the third charging unit.

9. The battery management system of claim 8, wherein the fourth control signal is given as an on-signal when the second and third control signals are respectively given as an on-signal, and
wherein the first control signal is given as an off-signal when the fourth control signal is given as an off-signal.

10. The battery management system of claim 9, wherein the A/D converter sequentially outputs the converted digital signals using one output terminal thereof.

11. The battery management system of claim 9, wherein the A/D converter comprises at least four output terminals; and
wherein the A/D converter converts the input data of the first, second, fourth, and fifth input terminals into digital data and outputs the converted data using the respective four output terminals thereof.

12. The battery management system of claim 1, wherein the A/D converter includes first, second and third input terminals for receiving outputs of the cell voltage measurer.

13. The battery management system of claim 1, wherein the A/D converter includes an input terminal for receiving an output of the pack voltage measurer.

14. The battery management system of claim 1, wherein the A/D converter includes an input terminal for receiving an output of the pack current measurer.

15. The battery management system of claim 1, wherein the first charging unit stores a cell voltage of any one of the battery cells of the first sub-pack.

* * * * *